United States Patent [19]

Coirier et al.

[11] Patent Number: 5,677,685
[45] Date of Patent: Oct. 14, 1997

[54] DEVICE FOR ASSISTANCE IN THE PILOTING OF AN AIRCRAFT

[75] Inventors: Philippe Coirier; Roger Parus, both of Mériguac, France

[73] Assignee: Sextant Avionique, Meudon La Foret, France

[21] Appl. No.: 539,101

[22] Filed: Oct. 4, 1995

[30] Foreign Application Priority Data

Oct. 18, 1994 [FR] France .................. 94 12408

[51] Int. Cl.$^6$ .................................. G01C 21/00
[52] U.S. Cl. .................. 340/979; 244/184; 340/971; 340/980; 342/33; 364/424.013
[58] Field of Search ................. 340/945, 963, 340/967, 971, 972, 974, 973, 975, 976, 979, 980, 953; 244/183, 184; 342/33, 439; 364/428, 429, 424.013, 424.06

[56] References Cited

U.S. PATENT DOCUMENTS

| | | |
|---|---|---|
| 3,521,227 | 7/1970 | Congleton et al. ............. 340/979 |
| 3,837,603 | 9/1974 | Schultz et al. . |
| 4,368,517 | 1/1983 | Lovering . |
| 4,419,079 | 12/1983 | Georges et al. . |
| 4,714,929 | 12/1987 | Davidson ...................... 340/979 |
| 5,014,053 | 5/1991 | Nguyen ......................... 340/979 |
| 5,420,582 | 5/1995 | Kubbat et al. ................ 340/974 |
| 5,610,600 | 3/1997 | Koenig .......................... 340/976 |

FOREIGN PATENT DOCUMENTS

| | | |
|---|---|---|
| 0 044 777 | 1/1982 | European Pat. Off. . |
| 0 418 558 A3 | 3/1991 | European Pat. Off. . |
| 2 389 535 | 2/1978 | France . |
| 2 666 428 | 3/1992 | France . |
| WO 94/04984 | 3/1994 | WIPO . |

Primary Examiner—Brent A. Swarthout
Attorney, Agent, or Firm—Oblon, Spivak, McClelland, Maier & Neustadt, P.C.

[57] ABSTRACT

This optoelectronic device is designed to provide assistance in the piloting of an aircraft under conditions of poor visibility, at the final approach stage, during taxiing and at take-off from a runway equipped with an ILS. The device consists of a collimator displaying a reticule symbolizing a runway centerline that is shown to the pilot during flight as well as on the ground, without any break between the in-flight final approach stage and the ground stage of taxiing on the runway. The device takes account of the pilot's off-centered position in the aircraft cockpit.

5 Claims, 4 Drawing Sheets

DEVICE FOR ASSISTANCE IN THE PILOTING OF AN AIRCRAFT

BACKGROUND OF THE DESCRIPTION

1. Field of the Invention

The present invention relates to optoelectronic devices for assistance in the piloting of aircraft under conditions of poor visibility, during the final approach stage, when taxiing and at take-off.

2. Description of the Prior Art

Optoelectronic devices for assistance in the piloting of an aircraft consist of collimators or head-up visors showing graphic and alphanumerical information before the eyes of an aircraft pilot or helicopter pilot. The information is presented in the form of reticules projected on a semi-reflective, optical device superimposed on the view of the outside world.

The performance characteristics obtained with these optoelectronic devices for assistance in piloting depend directly on the characteristics of the various reticules shown to the pilot, in terms of both capacity for comprehensive monitoring of the situation and precision of maneuvers performed manually.

The reticules usually displayed may be classified in different groups according to the indications that they give:

- information from the "basic Tee" of the instrument panel (pertaining to speed, attitude, course, altitude),
- information close to that provided by the "basic Tee" (pertaining to Mach number, rate of climb given by the rate-of-climb indicator, altitude given by the radio altimeter),
- information related to the trajectory (speed vector, acceleration, total slope),
- zone radio-navigation information (RNAV) enabling a course to be followed by means of radioelectrical beacons (using the VOR, ILS and DME systems),
- complementary situation control information (explicit instructions pertaining to route, course, etc., deviation from set values of speed, etc., indications of operating methods, various alarms, etc.).

In the field of civil aviation, collimators are used chiefly for the stages of landing flight, taxiing and take-off in conditions of poor visibility. They enable a reduction of the minimum operational levels of visibility and increase the safety of operations through an enhanced capacity to monitor the situation. They furthermore provide greater precision of control of the trajectory when flying by sight.

In the presently known methods of providing assistance in the stages of approach, taxiing on a runway and take-off under conditions of poor visibility, the pilot is shown a reticule on a collimator. This reticule is formed by a synthetic image of a runway, without any centerline of dashes, computed strictly in three dimensions. This synthetic image of a runway, which is superimposed on the real runway, is built out of an estimated position of the aircraft with respect to the real runway, this position being given by its navigation panel instruments. It is updated during the progress of the aircraft by means of algorithms that are exclusive in the sense that they cover only the in-flight part or the ground part of the aircraft trajectory. This causes a break in the presenting of information to the pilot at touch-down or at take-off.

SUMMARY OF THE INVENTION

The present invention is aimed at improving piloting assistance under conditions of poor visibility, in flight, at the final landing stage or, on the ground, during taxiing on a runway equipped with an ILS, this assistance being provided by the display, on the collimator, of a symbol of the runway centerline showing the alignment of the aircraft and its deviation from the axis of radioelectrical alignment of the ILS localizer receiver without any break between the stages on the ground and in flight, in order to increase the level of monitoring of the situation in general and the precision with which the trajectory is followed in particular.

An object of the invention is an optoelectronic device for assistance in the piloting of an aircraft that is provided with a flight collimator, ILS localizer and glide slope receivers and navigation instruments giving its course as well as its speed and its altitude with respect to the ground, where said aircraft is maneuvering in the neighborhood of a landing runway or take-off runway equipped with an ILS. This device has means for the display, on the collimator, of a line representing the runway centerline shown to the pilot in flight as well as on the ground, without any break between the flight stage of final approach at the runway threshold and the ground stage of taxiing on the runway. The said device comprises means to locate the original point of the line representing the runway centerline on the skyline graduated in a heading scale, at the point representing the set course coinciding with the orientation of the alignment axis given by the ILS localizer receiver and means to orient the line representing the runway centerline with respect to the skyline at an angle $\phi P$ taken as being equal in degrees to:

$$\phi P = -\arctan\left(\frac{Y_{ON}}{Z_{ON}}\right) \times \frac{1}{K} - 90°$$

where $Y_{ON}$ and $Z_{ON}$ are respectively the position, with respect to the axis of alignment of the ILS localizer receiver, laterally and vertically, of the location of the pilot's eyes looking through the collimator, and K is a coefficient of conversion of angles from degrees into radians.

The position, laterally with respect to the axis of alignment of the ILS localizer receiver, of the pilot's eyes looking through the collimator is deduced by the following relationship:

$$Y_{ON}=X_{AL}\times LOCRAD+(X_{LOCAN}-X_{PE})\times(COURSEL-HDGMG)\times K+Y_{PE}$$

in which:

$X_{AL}$ is the current distance between the antenna of the ILS localizer receiver on board the aircraft and the antenna of the ILS localizer transmitter located at the end of the runway, LOCRAD is the angular deviation in radians detected by the ILS localizer receiver, $X_{LOCAN}$ is the longitudinal coordinate, in the aircraft, of the ILS localizer receiver with respect to the aircraft reference system, $X_{PE}$ is the longitudinal coordinate, in the aircraft, of the position of the pilot's eye with respect to the aircraft reference system, COURSEL is the chosen course, in degrees, namely the ILS radioelectrical axis, HDGMG is the magnetic heading in degrees of the aircraft, and $Y_{PE}$ is the transversal coordinate in the aircraft of the position of the pilot's eye with respect to the aircraft reference system while the position, in vertical terms, of the pilot's eye with respect to the axis of alignment of the ILS localizer receiver is deduced by the following relationship:

$$Z_{ON} = ALTRA + (X_{PE} - X_{LDG}) \times PITANG \times K + (Z_{PE} - Z_{LDG})$$

in which:

ALTRA is the radio-altimeter height with compensation to give the height, with respect to the ground, of the wheels of the main landing gear, $X_{PE}$ is the longitudinal coordinate, in the aircraft, of the position of the pilot's eye with respect to the aircraft reference system, $X_{LDG}$ is the longitudinal coordinate, in the aircraft, of the main landing gear with respect to the aircraft reference system, PITANG is the angle of the pitch attitude of the aircraft in degrees, $Z_{PE}$ is the vertical coordinate, in the aircraft, of the position of the pilot's eye with respect to the aircraft reference system, and $Z_{LDG}$ is the vertical coordinate, in the aircraft, of the wheels of the main landing gear with respect to the aircraft reference system.

The current distance between the antenna of the ILS localizer receiver on board the aircraft and the antenna of the ILS localizer transmitter on the ground at the end of the runway is deduced by the following relationship:

$$X_{AL} = X_{ALO} + \int_0^t SPDGND \times dt$$

wherein:

SPDGND is the ground speed of the aircraft, and $X_{ALO}$ is the initial distance between the antenna of the ILS localizer receiver on board the aircraft and the antenna of the ILS localizer transmitter located at the end of the runway. At take-off, it has an a priori value, TOGA-DIST. At landing, assuming that the aircraft passes at the instant t=0 to the nominal runway threshold, i.e. being in the ILS approach glide slope beam with a deviation from this beam (GSDEV) that is negligible, at an arbitrary height close to 50 feet, this distance is estimated by the relationship:

$$X_{ALO} = -RWYLEN - \frac{(RATHRES + (Z_{GSAN} - Z_{LDG}) + (X_{GSAN} - X_{LDG}) \times PITCH_0 \times K)}{0.05235} + X_{LOCAN} - X_{GSAN}$$

wherein:

RWYLEN is an assumed, a priori length of runway at landing representing the distance on the ground between the ILS glide slope transmitter and localizer transmitter, RATHRES is the threshold value of the indication of the height of the landing gear with respect to the ground, given by the radio-altimeter for which it is considered that the aircraft is at the runway threshold, $Z_{GSAN}$ is the vertical coordinate, in the aircraft, of the antenna of the ILS glide slope receiver with respect to the aircraft reference system, $X_{GSAN}$ is the longitudinal coordinate, in the aircraft, of the antenna of the ILS glide slope receiver with respect to the aircraft reference system $PITCH_0$ is the pitch attitude of the aircraft when it passes through the runway threshold, and $X_{LOCAN}$ is the longitudinal coordinate, in the aircraft, of the antenna of the ILS localizer receiver with respect to the aircraft reference system.

The artificial runway centerline thus displayed on the collimator is used essentially, in conditions of poor visibility, to check the quality of an automatic approach or to hold the runway centerline directly by means of the directional cross-bar during the taxiing stages at take-off and at landing.

Indeed, through its position and orientation which are valid both during approaching and during taxiing, it provides information in a highly intuitive form, as necessary and to the extent sufficient for piloting, on the orientation and positional deviation of the aircraft with respect to the alignment axis of the ILS localizer receiver.

BRIEF DESCRIPTION OF THE DRAWINGS

Other features and advantages of the invention shall appear from the following description of an embodiment given by way of an example. This description will be made with reference to the drawings, of which.

MORE DETAILED DESCRIPTION

Figure 1:
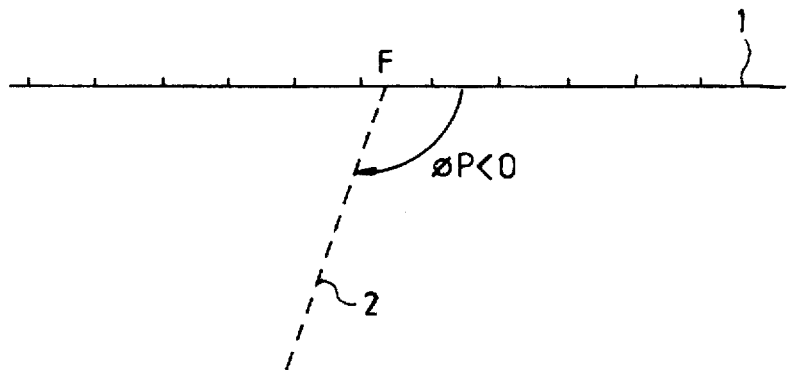
FIG. 1 shows the reticule of the runway centerline displayed by the device according to the invention on a flight collimator, FIG. 2 gives a schematic view, in the vertical plane, of an aircraft landing at the threshold of a runway in being guided by an ILS, and shows different parameters taken into account for the display of the runway centerline symbol, FIG. 3 gives a schematic view, in the vertical plane, of an aircraft at take-off at the end of a runway fitted out with an ILS, FIG. 4 gives a schematic view in the horizontal plane of an aircraft shown with respect to a runway provided at its end with an ILS localizer transmitter and shows different parameters taken into account to display the runway centerline symbol.

FIG. 1 shows a continuous horizontal line 1 that represents the skyline given by the inertia control unit of the aircraft and is usually graduated in a heading scale. The device according to the invention traces a runway centerline symbol towards the bottom of the screen of the collimator, starting from a point F of the skyline 1 given by the inertial control unit, and at an angle φP. This runway centerline symbol is formed by a line of dashes 2 that is superimposed on the radioelectrical axis of the ILS localizer alignment followed by the pilot during the stages of final approach, landing, taxiing or take-off, without any break or stalling during the passage from an in-flight approach stage to a ground taxiing stage during a landing.

The point F located on the skyline, at the starting point of the runway centerline symbol 2, is placed on the heading scale at the point representing the set course (COURSEL). This point is the course given by the ILS localizer receiver. It is very close to or identical to the runway course for runways open to approaches in conditions of poor visibility.

The orientation of the runway centerline symbol below the skyline given by the inertial control unit, namely the angle φP that it makes with this line, is computed as a function of the positional information given by the glide slope and localizer receivers of the ILS, by the radio-altimeter and the instruments for measuring course and ground speed, in taking account of the parallax due to the pilot's off-centered position in the aircraft cockpit.

The runway centerline symbol is displayed in flight as soon as the runway threshold is crossed as well as on the ground, during the taxiing stage, without any break. This is achieved by means of a computation algorithm that takes account of the geometry of the layout, on the runway, of the ILS glide slope and localizer transmitters or of an assumed, a priori estimate of this geometry and is suited to the specific features of the landing and take-off maneuvers. Indeed, the parameters such as the ILS glide slope deviation (GSDEV) and the radio-altimeter height (ALTRA) are not always valid or are subject to errors or bias in certain parts of the field of use.

The algorithm for displaying the runway centerline symbol performs the following tasks:

- computation of the initial distance ($X_{ALO}$) between the aircraft, or more precisely the antenna of its ILS localizer receiver and the antenna of the ILS localizer transmitter located on the ground at the end of the runway,
- computation of the current distance ($X_{AL}$) between the antenna of the ILS localizer receiver on board the aircraft and the antenna of the ILS localizer transmitter on the ground by integration of the ground speed of the aircraft,
- computation of the transversal and vertical coordinates of the location of the pilot's eye in relation to the ILS localizer radioelectrical alignment axis, and
- computation of the angle $\phi P$.

The computation relies on the following conventions:

The input parameters which are angular values are expressed in degrees.

All the small angles are identified with their trigonometric functions (sine or tangent) when they are expressed in radians.

The distances, lengths and heights are expressed in feet.

The distance $X_{AL}$ between the antenna (LOCAN) of the localizer receiver on board the aircraft and the antenna (L) of the localizer transmitter on the ground at the end of the runway is assessed with respect to the antenna (L) of the localizer transmitter along the axis of the runway oriented positively in the landing direction or take-off direction (with the localizer transmitter before the aircraft) so that its coordinate is negative at initialization.

Figure 2:
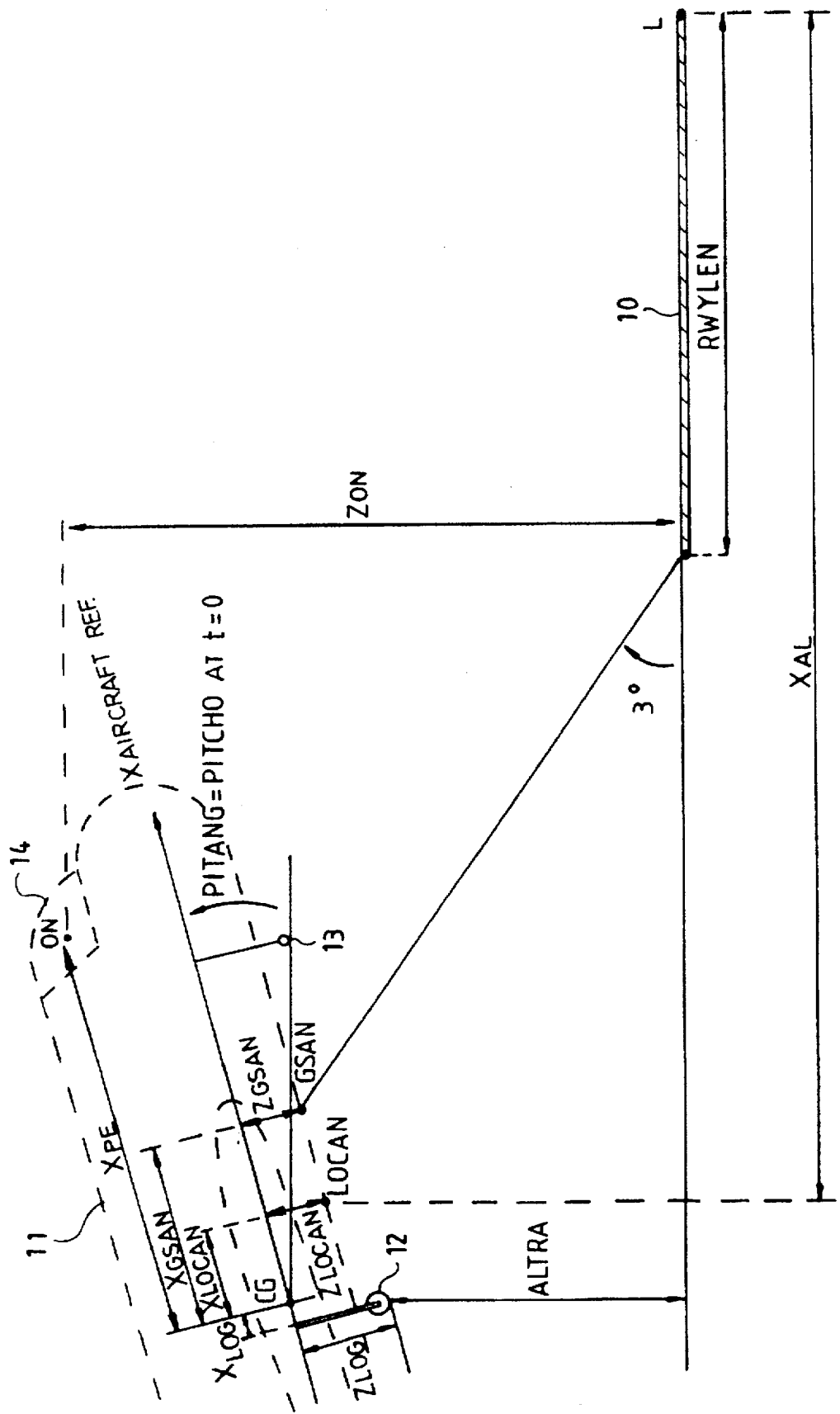

FIG. 2 illustrates the principle of computation of the initial distance $X_{ALO}$ in the case of the aircraft in an approach stage. This figure, which is a vertical sectional view, not drawn to scale, shows a runway 10 represented by a double hatched line, with a length RWYLEN having, at its far right end, at the point L, the antenna of an ILS localizer transmitter and, at its far left end, an aircraft 11 in an approaching stage, guided by the glide slope of the ILS. This aircraft 11, seen in a longitudinal vertical sectional view, has a center of gravity CG, at the level of its wings, at which there is localized the aircraft reference system, a main landing gear 12 and a front landing gear 13 between which there are positioned an ILS localizer reception antenna LOCAN and an ILS glide slope reception antenna GSAN. In the cockpit 14, a point ON marks the position of the pilot's eye. This aircraft is at the runway threshold in the glide slope beam of the ILS with a positive longitudinal pitch identified by an angle PITANG. At the instant t=0, where the aircraft crosses the runway threshold, the wheels of its main landing gear are at a height ALTRA equal to a threshold value RATHRES in the range of 50 feet while the antenna GSAN of its ILS glide slope receiver is in the glide slope beam of the ILS, the glide slope deviation (GSDEV) being assumed to be negligible. This is not a limitation because, if it were not the case, the ILS would send out an alarm asking for an interruption of the landing or a wave-off.

The height of the aircraft with respect to the ground is given by a radio-altimeter whose measurement (ALTRA) is with compensation to give the height of the wheels of the main landing gear above the ground.

The ILS glide slope goniometrical value is measured with reference to the glide slope receiver antenna (GSAN) whose coordinates ($X_{GSAN}$, ($Y_{GSAN}$=0), $Z_{GSAN}$) are known in the aircraft reference system.

As can be seen in FIG. 2, the initial distance $X_{ALO}$ is computed by the addition, to the runway length RWYLEN, of the horizontal distance between the antenna (LOCAN) of the localizer receiver and the runway interception nominal glide slope point counted negatively, which can be broken down into two factors.

The first factor:

$$\frac{(RATHRES + (Z_{GSAN} - Z_{LDG}) + (X_{GSAN} - X_{LDG}) \times PITCH_0 \times K)}{0.05235}$$

applies the value of the threshold of height RATHRES above the runway, the difference in height on board the aircraft ($Z_{GSAN}-Z_{LDG}$) between the ILS glide slope receiver antenna (GSAN) and the main landing gear and a term that corrects this difference in height in taking account firstly of the longitudinal distance ($X_{GSAN}-X_{LDG}$) in the aircraft between the antenna GSAN and the main landing gear and secondly of the non-zero longitudinal pitch $PITCH_0$ of the aircraft. It corresponds to the horizontal distance between the antenna LOCAN of the localizer receiver and the nominal glide slope interception point, given the longitudinal pitch of the aircraft. The term 0.05235 radian corresponds, for its part, to the nominal slope of an ILS glide slope beam, namely 3°.

The second factor $-(X_{GSAN}-X_{LOCAN})$ corresponds to the longitudinal offset, on the aircraft, of the antennas of the ILS glide slope and localizer receivers.

Given these two correction factors, the general expression defining the initial distance $X_{ALO}$ has the form:

$$X_{ALO} = -RWYLEN - \qquad (1)$$

$$\frac{(RATHRES + (Z_{GSAN} - Z_{LDG}) + (X_{GSAN} - X_{LDG}) \times PITCH_0 \times K)}{0.05235} +$$

$$X_{LOCAN} - X_{GSAN}$$

Figure 3:
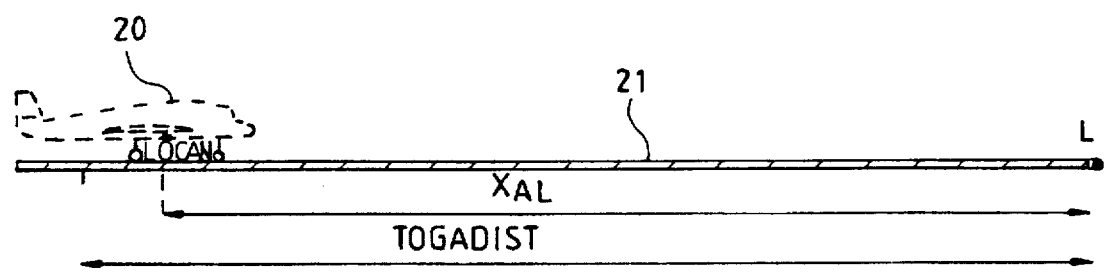

FIG. 3 illustrates the principle of the determining of the initial distance $X_{ALO}$ in the case of an aircraft at take-off. This FIG. 3 shows an aircraft 20 at the far left end of the runway 21. This runway 21 is equipped, at its far right, at a point L, with an antenna of an ILS localizer transmitter.

In this case, the radio-altimeter height ALTRA is zero and the aircraft is located, when it is ready for take-off, close to that end of the runway which is furthest from the ILS localizer transmitter. Only the localizer is used for lateral guidance on the runway. The initial distance $X_{ALO}$ between the antenna LOCAN of the localizer receiver on board the aircraft and the antenna (L) of the localizer emitter on the ground is estimated at an assumed, a priori value TOGADIST, representing the length of runway used.

$$X_{ALO} = -TOGADIST \qquad (2)$$

In flight as well as on the ground, the distance $X_{AL}$ is estimated by re-updating the distance $X_{ALO}$ by means of a corrective term obtained by integrating the ground speed of the aircraft SPDGND.

$$X_{AL} = X_{AL0} + \int_0^t SPDGND \times dt \quad (3)$$

Figure 4:
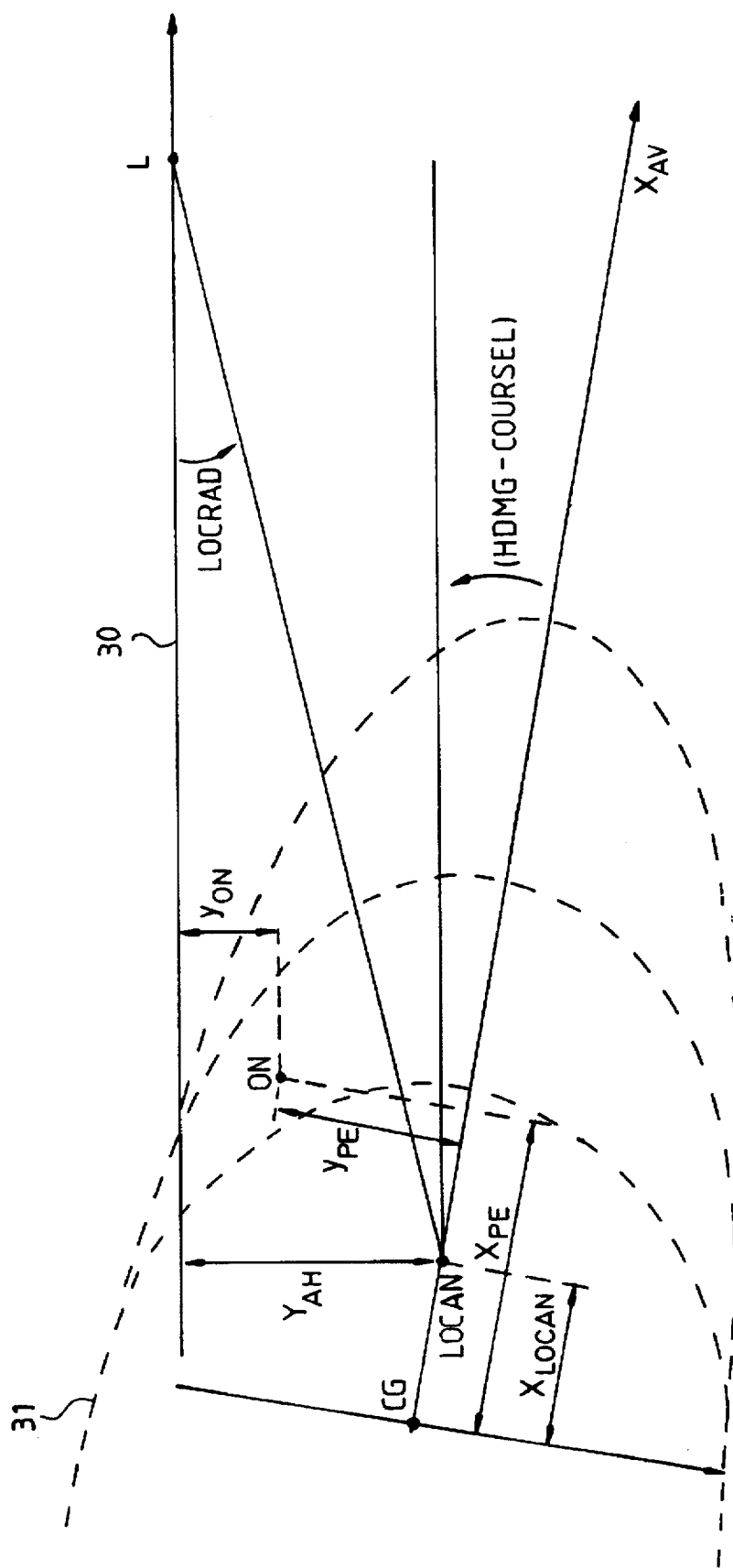

FIG. 4 illustrates the principle of the determining of the position of the aircraft pilot's eye laterally with respect to the radioelectrical alignment axis of the ILS localizer. This figure, which is a top view that is not drawn to scale, shows a runway centerline 30 having an ILS localizer transmitter antenna at its far right end at the point L. An aircraft 31, whose front tip with the cockpit is depicted by lines of dashes, is positioned on this runway. It has a longitudinal axis $X_{AV}$ passing through its center of gravity CG on which there is referenced the position of the antenna LOCAN of the ILS localizer receiver. The pilot looking through the collimator is assumed to be placed at the left of the cockpit, with his eyes at the level of the point ON. The aircraft is offset laterally with respect to the radioelectrical alignment axis of the ILS localizer and is out of axis. Its longitudinal axis $X_{AV}$ forms a heading error angle with the direction of the ILS localizer axis that is equal to the difference between the magnetic heading HDGMG of the aircraft and the course of the alignment axis COURSEL.

The lateral deviation $Y_{AH}$ of the position of the antenna LOCAN of the localizer receiver with respect to the alignment axis of the ILS localizer is given by the distance $X_{AL}$ between the aircraft and the ILS localizer transmitter multiplied by the tangent of the angle of deviation LOCRAD given by the localizer receiver:

$$Y_{AH} = X_{AL} \times LOCRAD$$

To deduce the coordinate YON of the pilot's eye laterally with respect to the ILS localizer alignment axis, this lateral deviation $Y_{AH}$ is corrected with two corrective terms. The first corrective term takes account of the longitudinal distance in the aircraft existing between the position of the antenna LOCAN of the ILS localizer receiver and position of the pilot, in taking account of the error of orientation of the aircraft with respect to the direction of the ILS localizer alignment axis.

$$(X_{LOCAN} - X_{PE}) \times (COURSEL - HDGMG) \times K$$

$X_{LOCAN}$ being the longitudinal distance, in the aircraft, between the antenna LOCAN and the center of gravity CG of the aircraft chosen as the starting point of the aircraft reference system and $X_{PE}$ being the longitudinal distance, in the aircraft, of the pilot's position with respect to the center of gravity CG of the aircraft. The second corrective term takes account of the lateral deviation $Y_{PE}$ of the pilot's position with respect to the longitudinal axis of the aircraft. The result thereof is that the coordinate $Y_{ON}$ of the pilot's eye laterally with respect to the ILS localizer alignment axis is expressed by the relationship:

$$Y_{ON} = X_{AL} \times LOCRAD + (X_{LOCAN} - X_{PE}) \times (COURSEL - HDGMG) \times K + Y_{PE} \quad (4)$$

The coordinate of the pilot's eye vertically with respect to the runway is computed in assuming that the roll attitude of the aircraft is negligible or zero. This coordinate corresponds to a value equal to the height of the main landing gear above the runway ALTRA given by the radio-altimeter corrected by two terms. A first corrective term takes account of the deviation in height due to the longitudinal distance existing between the position of the pilot and that of the main landing gear and to the positive pitch attitude of the aircraft:

$$(X_{PE} - X_{LDG}) \times PITANG \times K$$

A second corrective term ($Z_{PE-ZLDG}$) takes account of the difference in height in the aircraft between the pilot's eye and the wheels of the main landing gear. The result thereof is that the coordinate $Z_{ON}$ of the pilot's eye vertically with respect to the runway is expressed by the relationship:

$$Z_{ON} = ALTRA + (X_{PE} - X_{LDG}) \times PITANG \times K + (Z_{PE} - Z_{LDG}) \quad (5)$$

For the graphic tracing of the runway centerline reticule, the computation of the angle $\phi P$ takes account, in addition to the visual parallax effect, of an original offset of the angles due to the fact that the axis of the runway is shown under the horizon reference and is perpendicular to this reference when the aircraft is accurately positioned and oriented with respect to the radioelectrical alignment axis of the ILS Localizer.

$$\phi P = -\arctan\left(\frac{Y_{ON}}{Z_{ON}}\right) \times K - 90° \quad (6)$$

The runway centerline thus traced on the collimator is essentially used, under conditions of poor visibility, to check the quality of an automatic approach and, by the use of the control bar, to achieve the direct holding of the runway centerline during the taxiing stage at take-off and at landing. For, it provides information in a highly intuitive form, as necessary and to an extent sufficient for piloting, on the orientation and positional deviation of the aircraft with respect to the radioelectrical alignment axis of the ILS localizer, this axis itself being very close to or merged with the axis of the runway.

Figure 5:
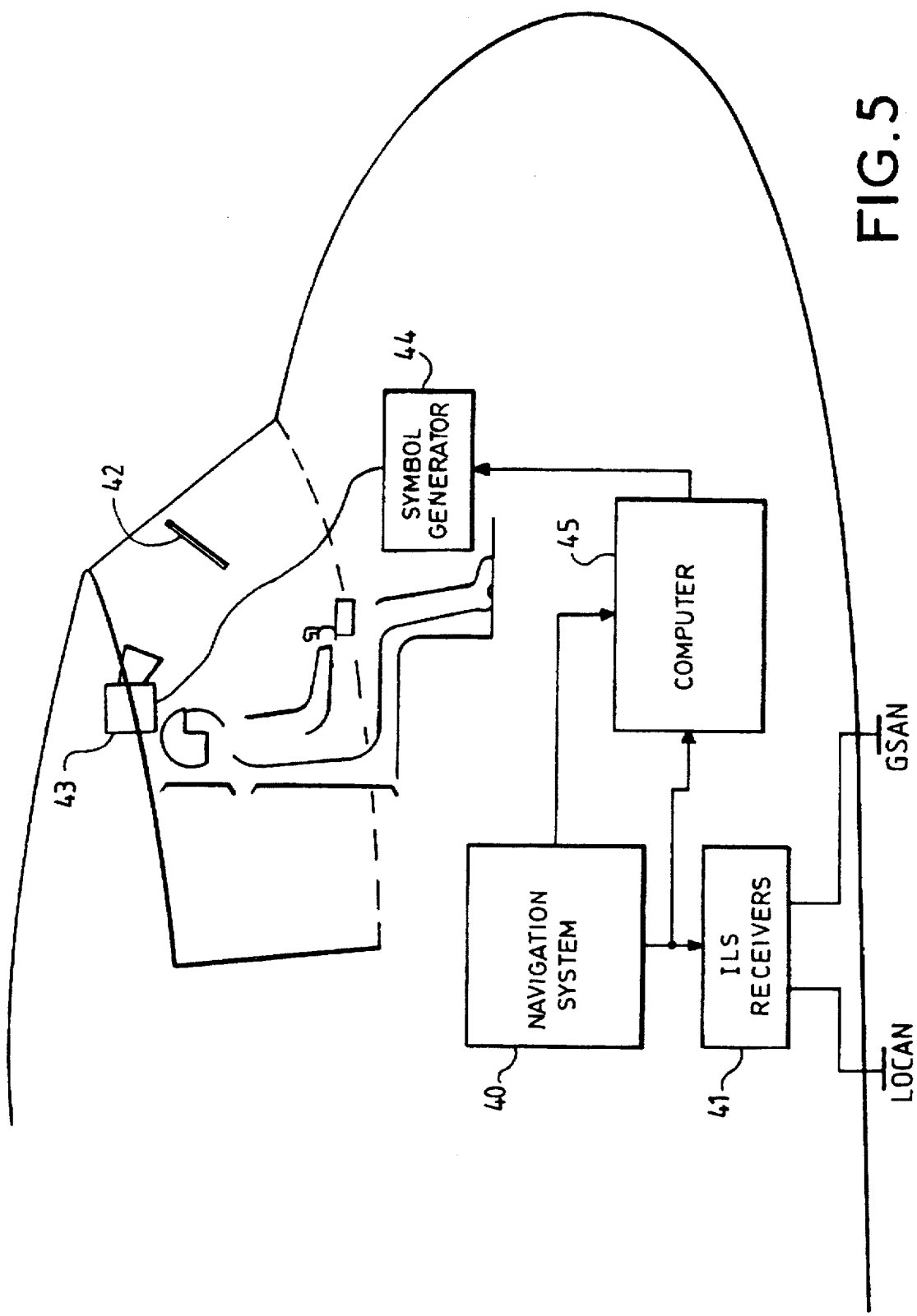
FIG. 5 is a drawing illustrating the general architecture of a device for the implementation of the invention on board an aircraft.

FIG. 5 illustrates the general architecture of a piece of equipment installed on board an aircraft for the display, before the pilot's eyes, of this runway centerline symbol during a landing stage, from the passage of the aircraft through the runway threshold until touchdown by the wheels and the taxiing of the aircraft on the runway, as well as during a stage of take-off while it is taxiing on the runway. The aircraft, of which it is possible to see the front part with the cockpit, is equipped with a navigation system 40 and ILS glide slope and localizer receivers 41, a semi-reflective optical system as well as devices for image projection 43 and symbol generation 44.

The ILS localizer and glide slope receivers 41 are connected to antennas GSAN and LOCAN positioned under the belly of the aircraft.

The navigation system 40 gives the usual indications, notably magnetic heading, ground speed and altitude relative to the ground.

The projection device 43 displays various reticules pertaining to piloting, including a runway centerline in the landing or take-off stage, on the transparent screen 42 placed before the pilot's eyes and superimposed on the outside scene.

The projection device 43 is controlled by a symbol generator 44 that receives updating commands from a computer 45 connected to the navigation system 40 and to the outputs of the ILS glide slope and localizer receivers 41. The computer 45 is a programmed logic computer that regularly updates the different reticules, notably the one symbolizing the runway centerline. It ensures that the reticule symbolizing a runway centerline is displayed, at landing, as soon as the aircraft is at the runway threshold and that it is held after touchdown during the taxiing on the runway as well as at take-off during taxiing on the runway. It locates the starting point F of this reticule symbolizing a runway centerline on the skyline at a course point corresponding to the runway course given by the ILS localizer receiver and orients the direction of the line of dashes of this reticule so that it coincides with the radioelectrical alignment axis of the ILS localizer axis as it should be perceived by the pilot. It does this by implementing algorithms performing the following tasks:

computation of the initial distance $X_{ALO}$ at landing as well as take-off, according to the relationships (1) and (2), computation of the current distance $X_{AL}$ at each instant by integrating the ground speed of the aircraft according to the relationship (3), computation, at each instant, of the co-ordinates of the position of the pilot's eye $Y_{ON}$ and $Z_{ON}$ in the horizontal plane and in a vertical plane, pertaining to the radioelectrical alignment axis of the ILS localizer according to the relationships (4) and (5), and computation of the angle $\phi P$ at each instant according to the relationship (6).

Of course, the invention is not limited to the example described. In particular, it includes the following variants:

other graphic features for the runway centerline reticule, taking account of a set heading other than the one given by the ILS, taking account of a variable set slope, taking account of the set parameters given by an aircraft system other than the one of which the collimator forms a part, in-flight initialization before the nominal runway threshold.

What is claimed is:

1. An optoelectronic device for assistance in the piloting of an aircraft that is provided with a collimator, ILS localizer and glide slope receivers and navigation instruments giving its course as well as its speed and altitude with respect to the ground, where said aircraft is maneuvering in the neighborhood of a landing runway or take-off runway equipped with an ILS, said device comprising means for the display, on the collimator, of a line representing the runway centerline shown to the pilot in flight as well as on the ground, without any break between the flight stage of final approach at the runway threshold and the ground stage of taxiing on the runway, wherein said device comprises means to locate the original point of the line representing the runway centerline on a skyline graduated in a heading scale, at the point representing a set course coinciding with the orientation of the alignment axis given by the ILS localizer receiver and means to orient the line representing the runway centerline with respect to the skyline at an angle $\phi P$ taken as being equal in degrees to:

$$\phi P = -\arctan\left(\frac{Y_{ON}}{Z_{ON}}\right) \times \frac{1}{K} - 90°$$

where $Y_{ON}$ and $Z_{ON}$ are respectively the position, with respect to the axis of alignment of the ILS localizer receiver, laterally and vertically, of the location of the pilot's eyes looking through the collimator, and K is a coefficient of conversion of angles from degrees into radians.

2. A device according to claim 1, comprising means to determine the position YON, laterally with respect to the axis of alignment of the ILS localizer receiver, of the pilot's eyes looking through the collimator implementing by the relationship:

$$Y_{ON}=X_{AL}\times LOCRAD+(X_{LOCAN}-X_{PE})\times(COURSEL-HDGMG)\times K+Y_{PE}$$

in which:

$X_{AL}$ is the current distance between the antenna of the ILS localizer receiver on board the aircraft and the antenna of the ILS localizer transmitter located at the end of the runway, LOCRAD is the angular deviation in radians detected by the ILS localizer receiver, $X_{LOCAN}$ is the longitudinal coordinate, in the aircraft, of the ILS localizer receiver with respect to the aircraft reference system, $X_{PE}$ is the longitudinal coordinate, in the aircraft, of the position of the pilot's eye with respect to the aircraft reference system, COURSEL is the chosen course, in degrees, namely the ILS radioelectrical axis, HDGMG is the magnetic heading in degrees of the aircraft, and $Y_{PE}$ is the transversal coordinate in the aircraft of the position of the pilot's eye with respect to the aircraft reference system.

3. A device according to claim 1, comprising means to determine the position $Z_{ON}$, with respect to the runway, vertically, of the pilot's eye looking through the collimator, implementing the relationship:

$$Z_{ON}=ALTRA+(X_{PE}-X_{LDG})\times PITANG\times K+(Z_{PE}-Z_{LDG})$$

in which:

ALTRA is the radio-altimeter height with compensation to give the height with respect to the ground of the wheels of the main landing gear, $X_{PE}$ is the longitudinal coordinate, in the aircraft, of the position of the pilot's eye with respect to the aircraft reference system, $X_{LDG}$ is the longitudinal coordinate, in the aircraft, of the main landing gear with respect to the aircraft reference system, PITANG is the longitudinal pitch angle of the aircraft in degrees, $Z_{PE}$ is the vertical coordinate, in the aircraft, of the position of the pilot's eye with respect to the aircraft reference system, and $Z_{LDG}$ is the vertical of the wheels of e aircraft, of the wheels of the main landing gear with respect to the aircraft reference system.

4. A device according to claim 2, comprising means to determine the current distance $X_{AL}$ between the antenna of the ILS localizer receiver on board the aircraft and the antenna of the ILS localizer transmitter on the ground at the end of the runway, implementing the relationship:

$$X_{AL} = X_{ALO} + \int_0^t SPDGND \times dt$$

wherein:

SPDGND is the ground speed of the aircraft, and $X_{ALO}$ is the initial distance between the antenna of the ILS localizer receiver on board the aircraft and the antenna of the ILS localizer transmitter located at the end of the runway.

5. A device according to claim 4, comprising means for the determining, during a landing stage, of the initial distance $X_{ALO}$ between the antenna of the ILS localizer receiver on board the aircraft and the antenna of the ILS localizer transmitter located at the end of the runway, implementing the relationship:

$$X_{ALO} = -RWYLEN - \frac{(RATHRES + (Z_{GSAN} - Z_{LDG}) + (X_{GSAN} - X_{LDG}) \times PITCH_0 \times K)}{0.05235} + X_{LOCAN} - X_{GSAN}$$

in which:

RWYLEN is an assumed, a priori length of runway at landing representing the distance on the ground between the ILS glide slope transmitter and localizer transmitter, RATHRES is the threshold value of the indication of height of the landing gear with respect to the ground, given by the radio-altimeter for which it is considered that the aircraft is at the runway threshold, $Z_{GSAN}$ is the vertical coordinate, in the aircraft, of the antenna of the ILS glide slope receiver with respect to the aircraft reference system, $Z_{LDG}$ is the vertical coordinate, in the aircraft, of the wheels of the main landing gear, $X_{GSAN}$ is the longitudinal coordinate, in the aircraft, of the antenna of the ILS glide slope receiver with respect to the aircraft reference system, $X_{LDG}$ is the longitudinal coordinate, in the aircraft, of the main landing gear, $PITCH_0$ is the longitudinal pitch of the aircraft when it passes through the runway threshold, and $X_{LOCAN}$ is the longitudinal coordinate, in the aircraft, of the antenna of the ILS localizer receiver with respect to the aircraft reference system.

* * * * *